Figure 1:
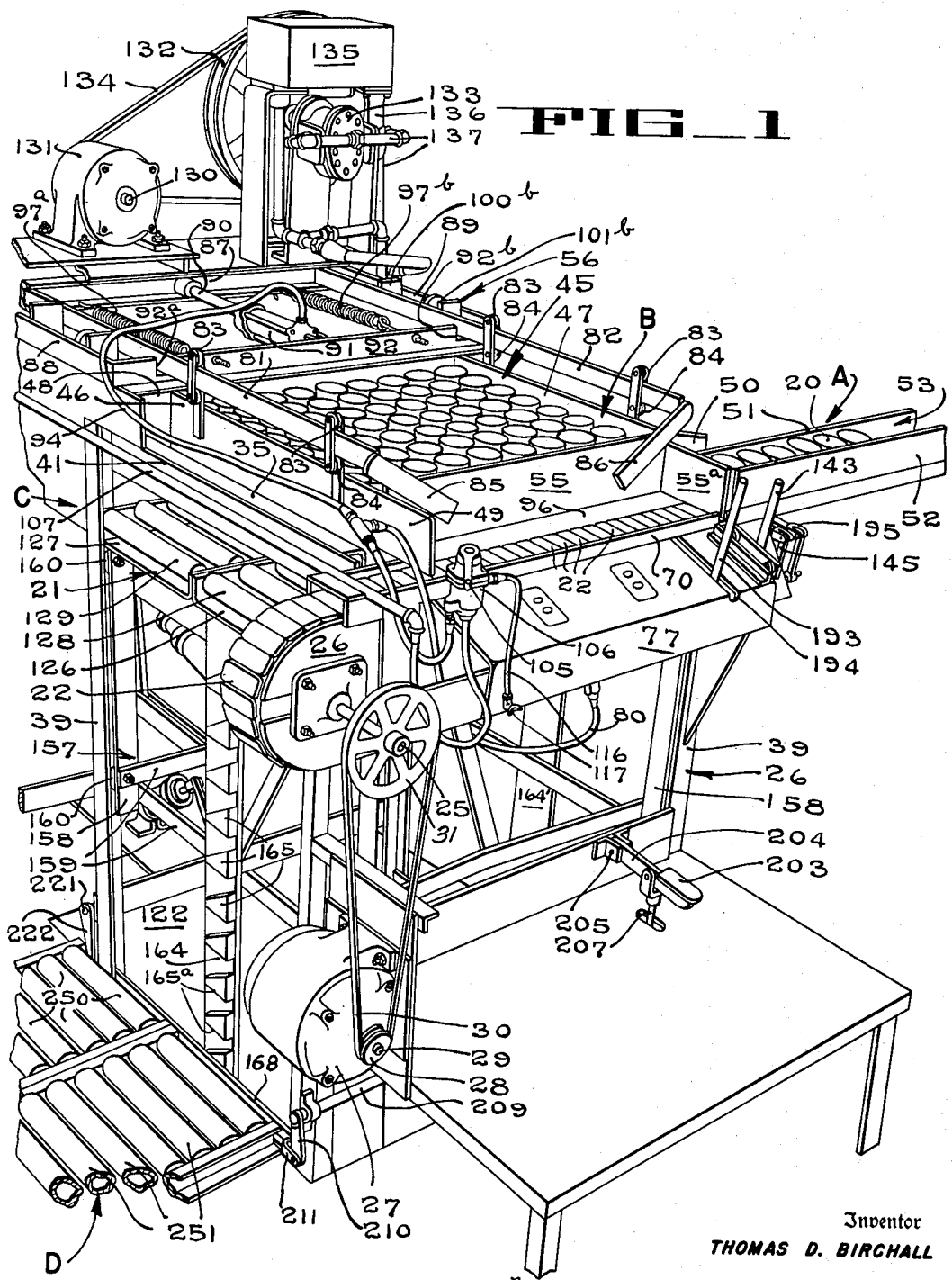

March 27, 1956  T. D. BIRCHALL  2,739,718
MACHINE FOR STACKING CANS
Filed Dec. 27, 1949  10 Sheets-Sheet 3

March 27, 1956    T. D. BIRCHALL    2,739,718
MACHINE FOR STACKING CANS
Filed Dec. 27, 1949    10 Sheets-Sheet 4

Inventor
THOMAS D. BIRCHALL
By Hans G. Hoffmeister
Attorney

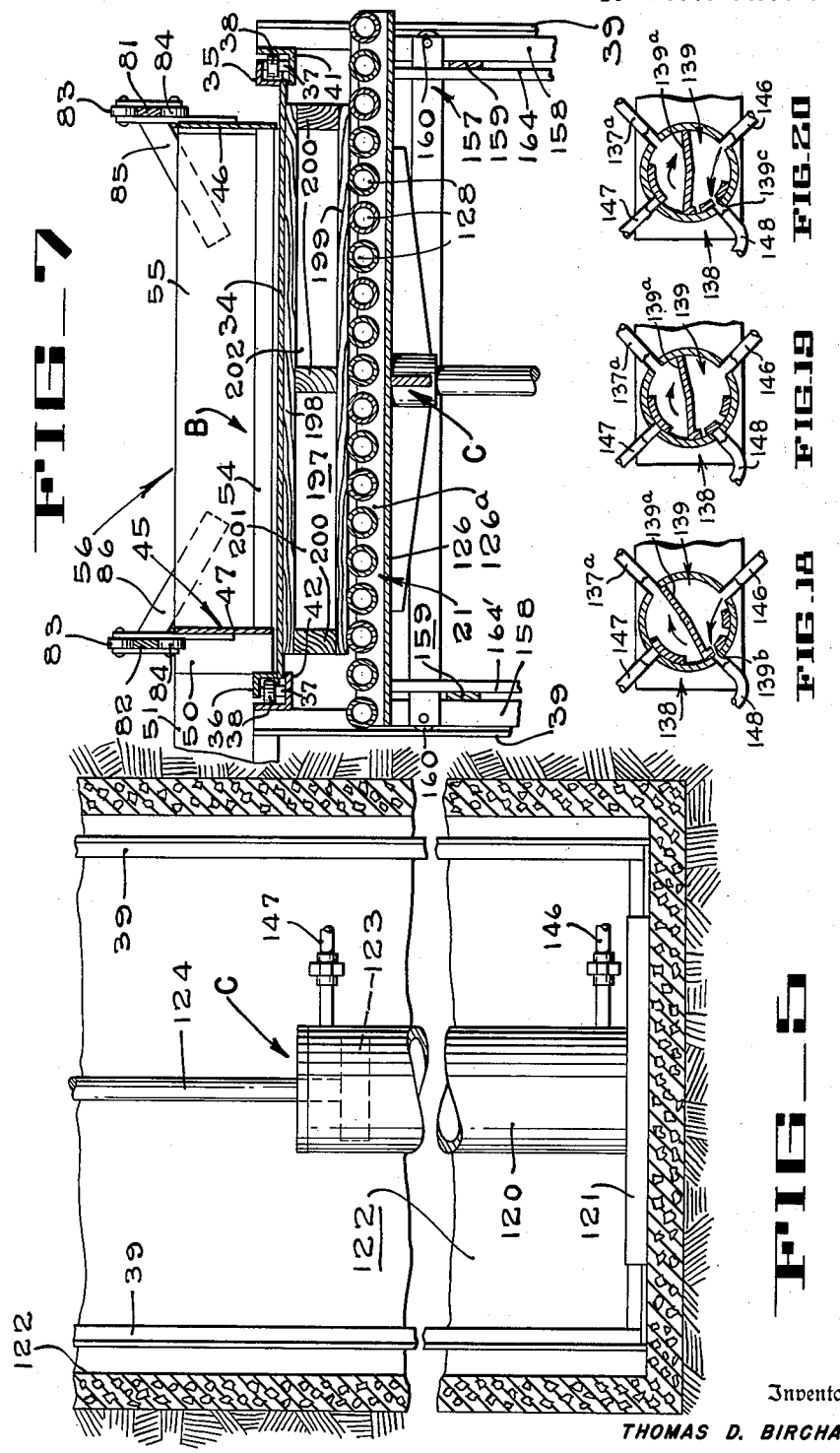

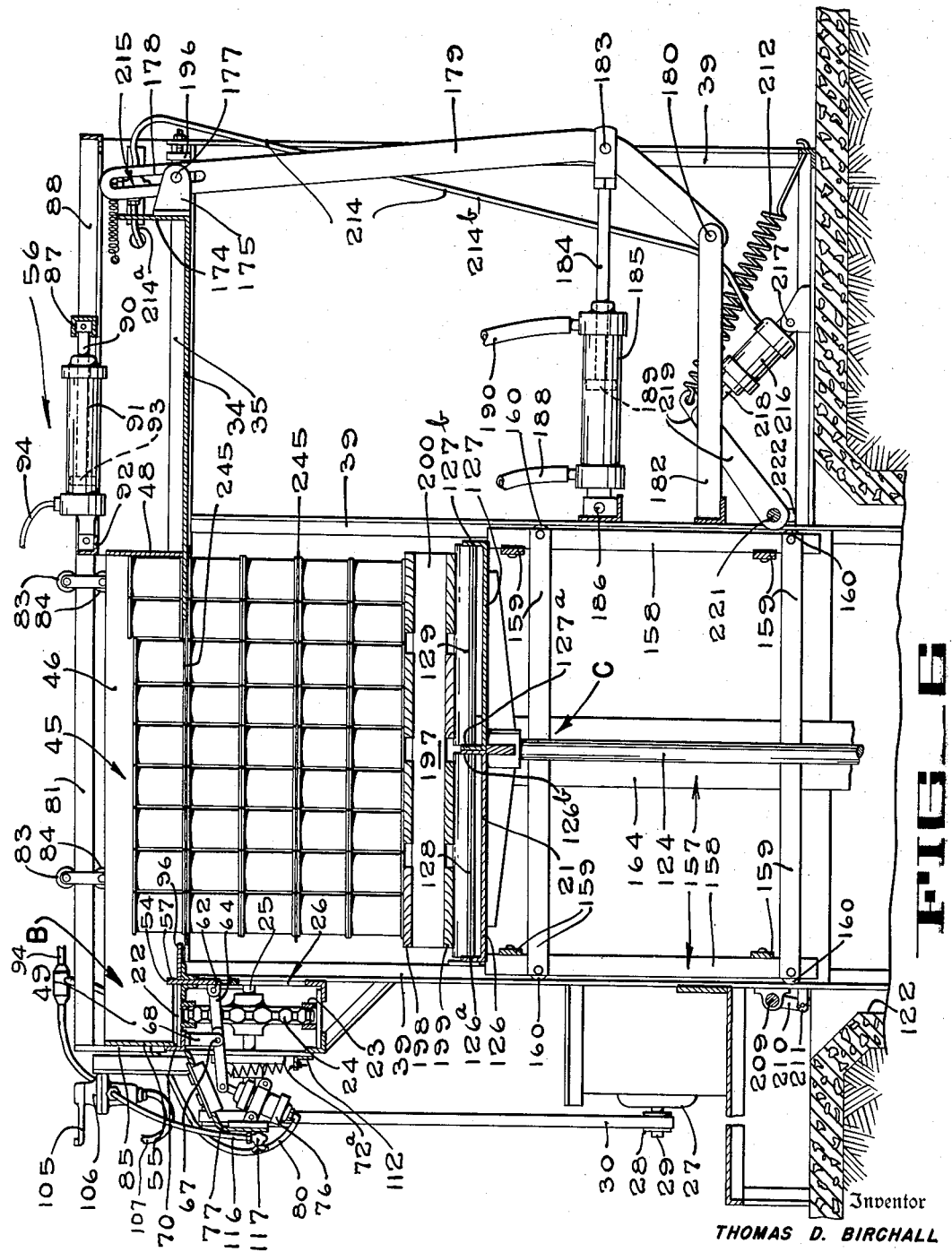

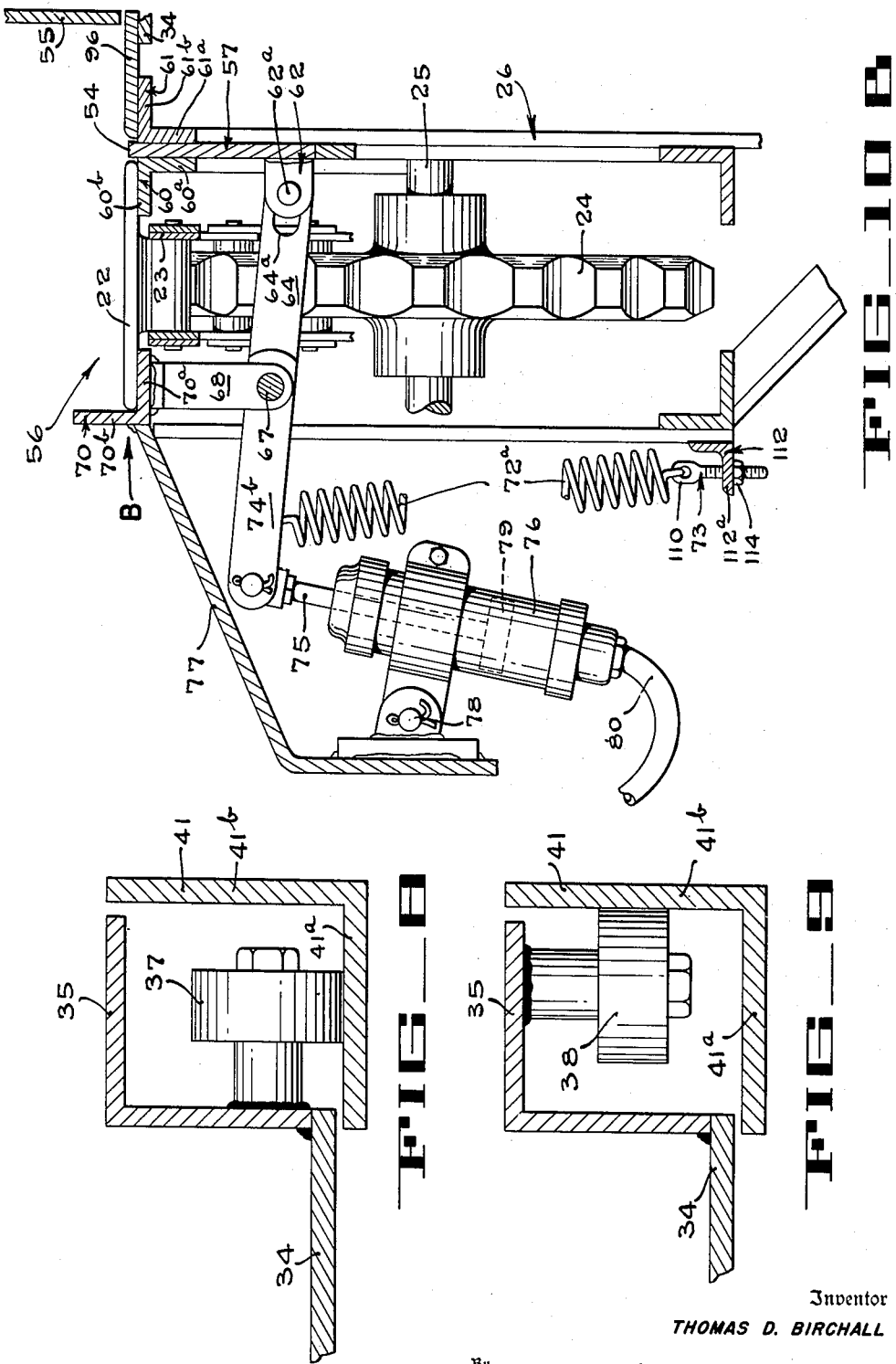

March 27, 1956  T. D. BIRCHALL  2,739,718
MACHINE FOR STACKING CANS
Filed Dec. 27, 1949  10 Sheets-Sheet 8

Inventor
THOMAS D. BIRCHALL
By Hans G. Hoffmeister
Attorney

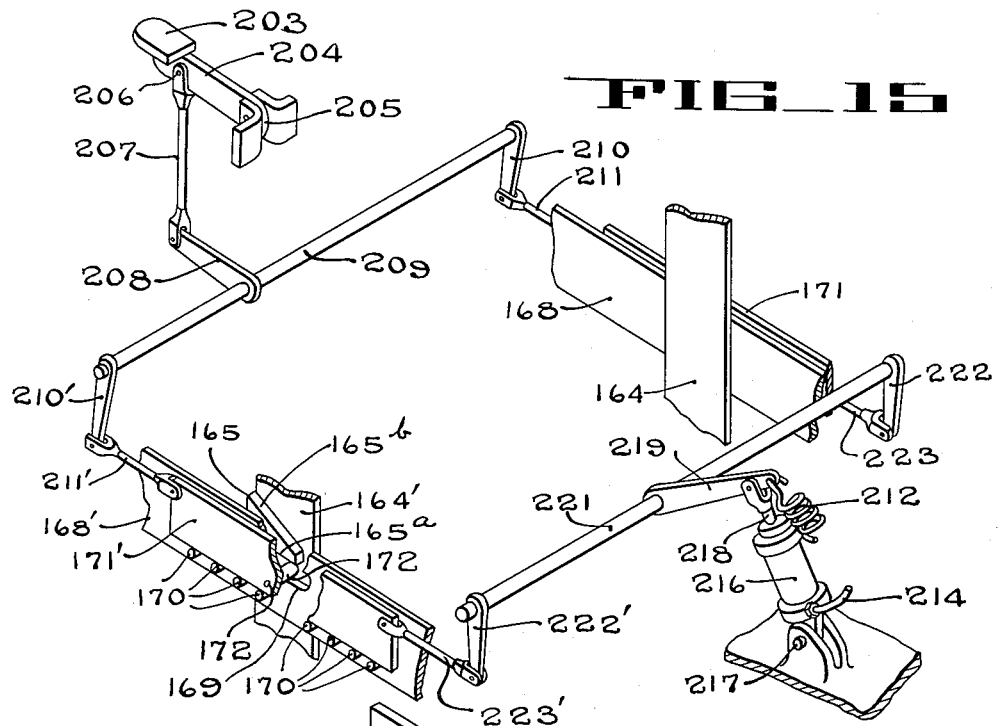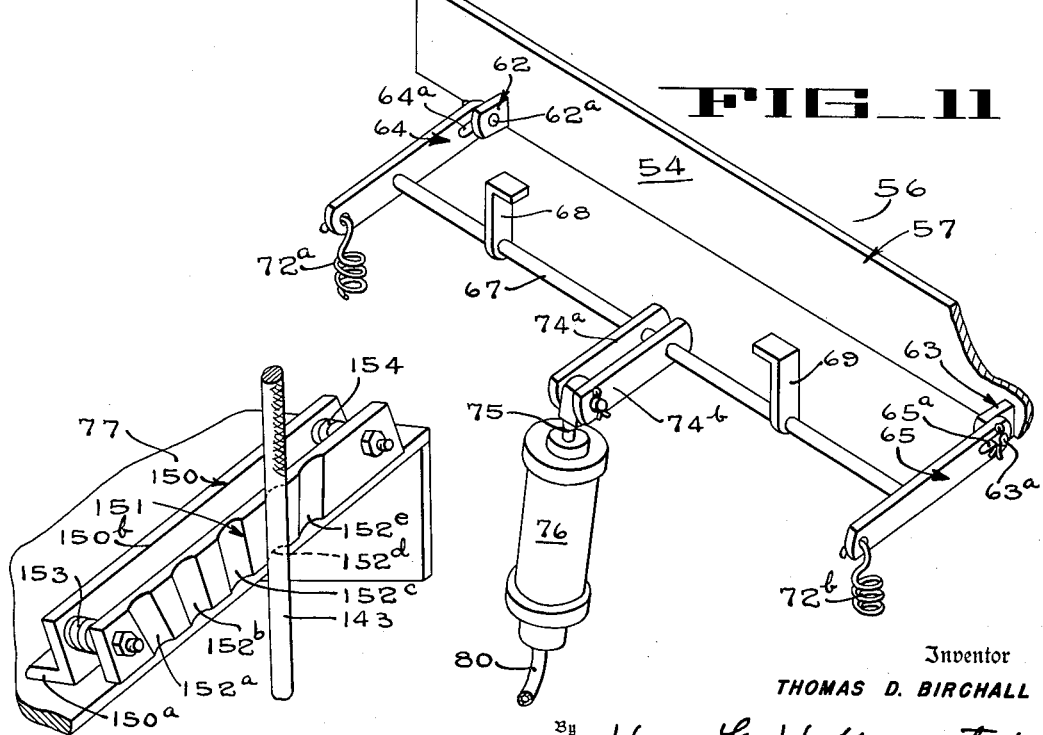

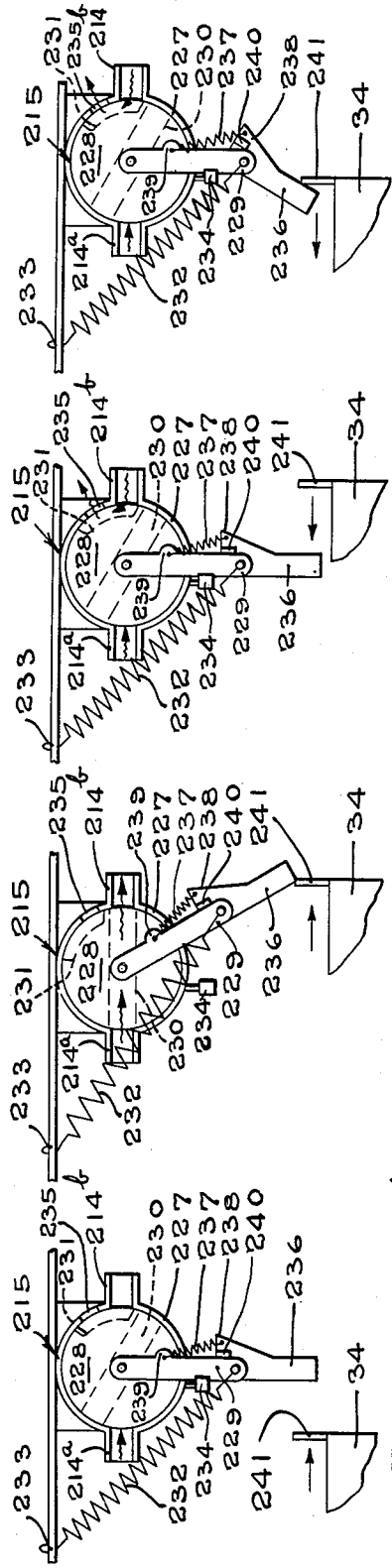
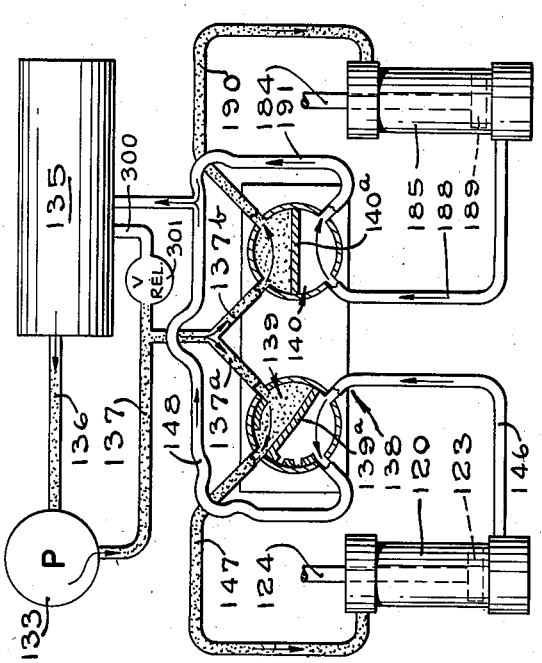
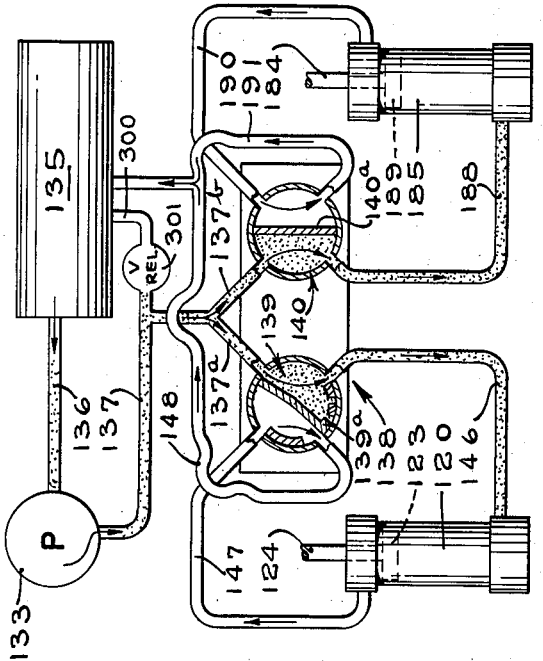

United States Patent Office 2,739,718
Patented Mar. 27, 1956

2,739,718

MACHINE FOR STACKING CANS

Thomas D. Birchall, Turlock, Calif., assignor to G. W. Hume Company, Turlock, Calif., a corporation of California Application December 27, 1949, Serial No. 135,257

6 Claims. (Cl. 214—6)

The present invention relates to machines for stacking food-containing cans and like articles in many superposed tiers for the purpose of storage.

In practice processed food-containing cans are frequently stored in this manner because at the time of processing the cans the canner may not know who will buy his goods, and hence labeling of the processed cans must be deferred until they are sold. In cases of this kind it is customary practice to remove the processed cans manually from the conveyor leading from the processing equipment and stack them in tiers eight or nine tiers high on suitable foundations of wood that are commonly called pallets. The loaded pallets are then stacked on top of one another in a warehouse pending sale; and when the canner has sold a lot of canned goods the requisite number of pallets are removed from the warehouse and the cans are fed into a labeling machine to be provided with the labels of the particular purchaser before they are boxed and shipped out.

It is an object of the present invention to eliminate the laborious and expensive task of loading food-containing cans or like articles by hand onto pallets, trays or like supports.

Another object is to provide a machine that is effective to arrange cans arriving in a single file column into multi-row layers or tiers.

Yet another object is to provide a mechanism adapted to stack a desired number of can tiers in superposed condition upon a pallet or like support without involving manual handling of said cans.

An additional object is to provide mechanism for shifting a predetermined number of cans from a single file line onto an adjacent support adapted to accommodate a multi-row layer of cans.

Furthermore, it is an object to provide an arrangement, of the type stated, wherein said support may be removed from underneath the cans deposited thereon to drop said cans onto a table or platform below.

Yet another object is to provide an arrangement, of the type referred to, which comprises means automatically effective to lower said platform or table by a distance equal to the height of a can layer whenever a layer of cans has been deposited thereon.

Figure 2:
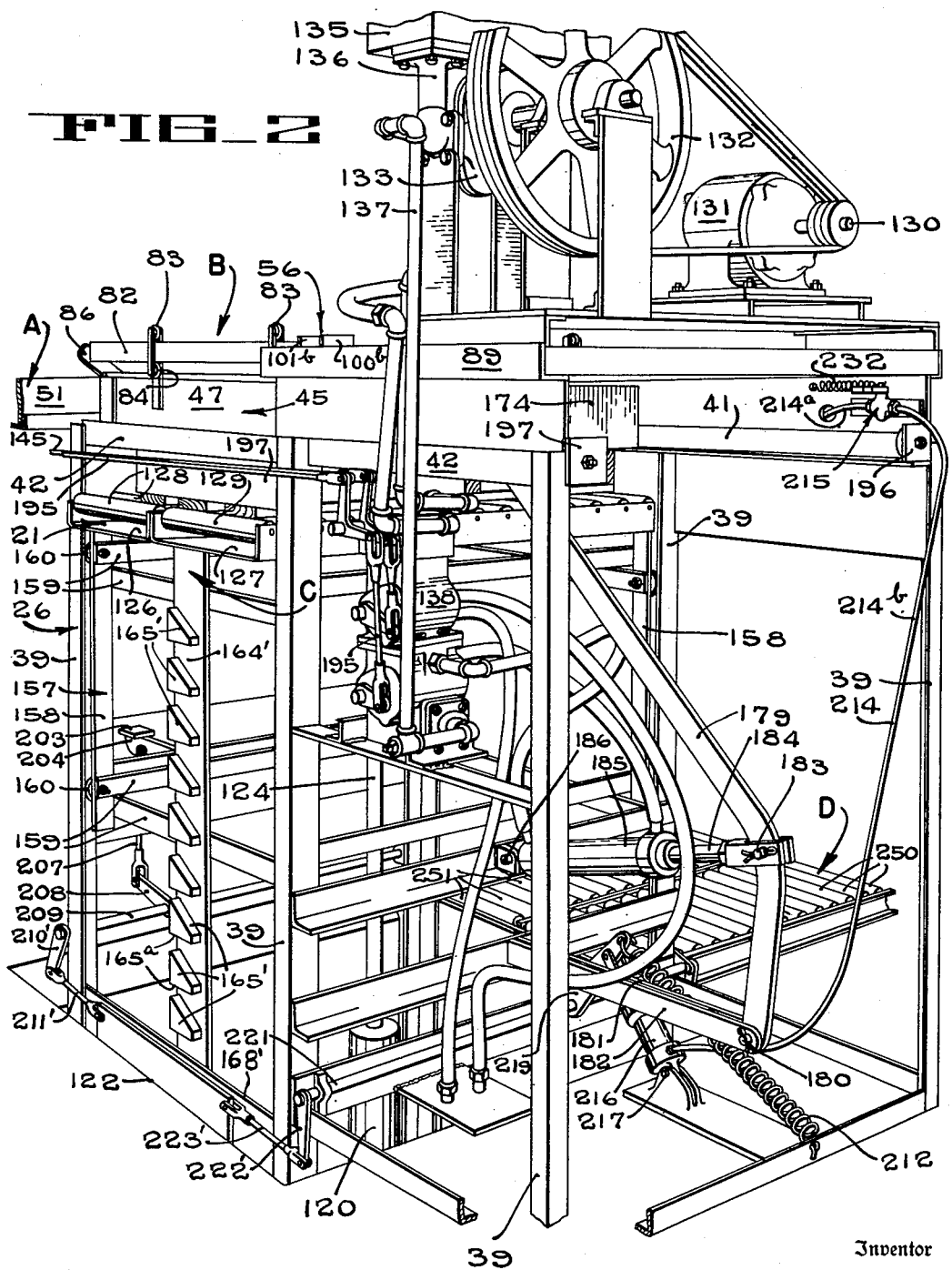
Figure 3:
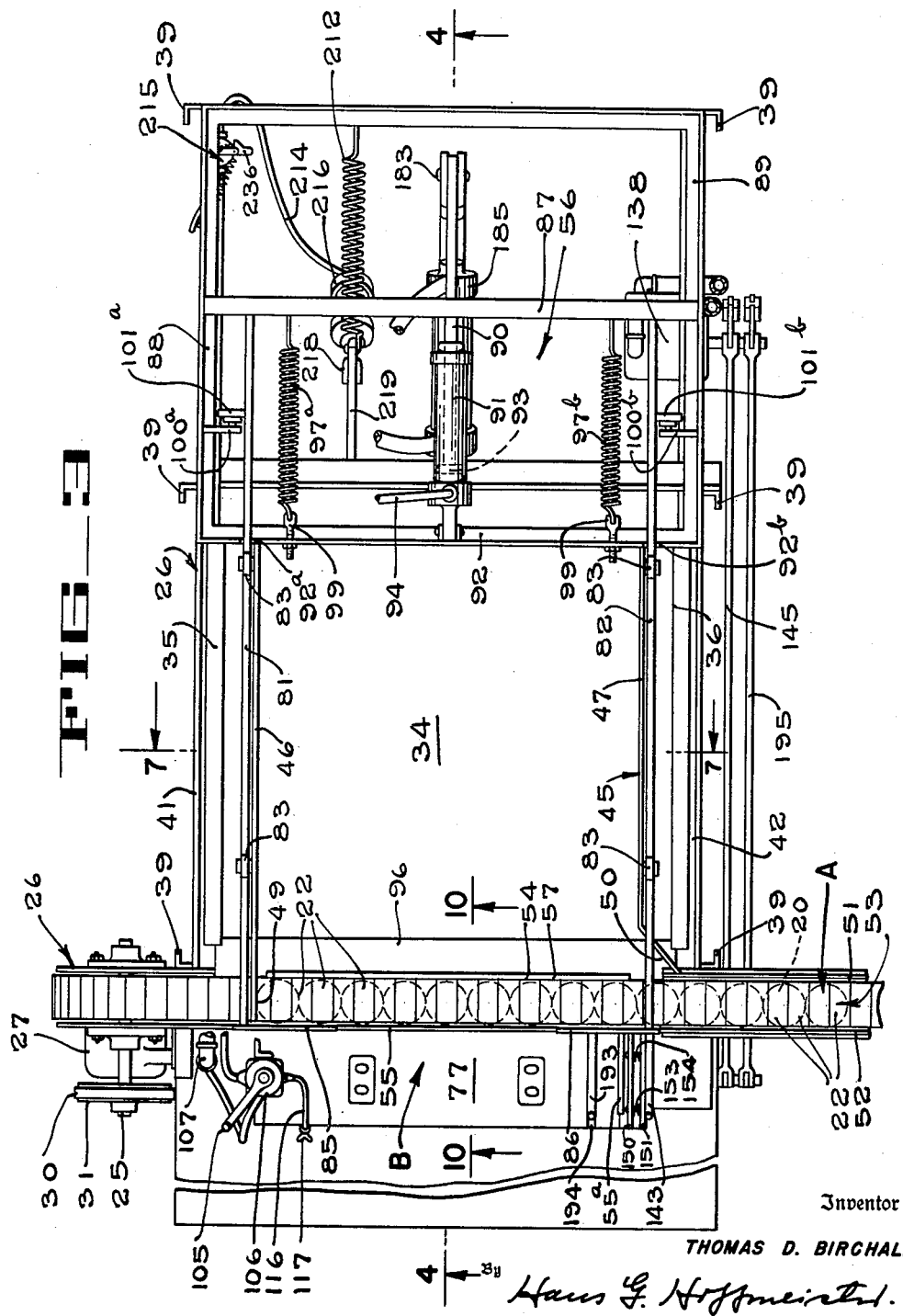
Figure 4:
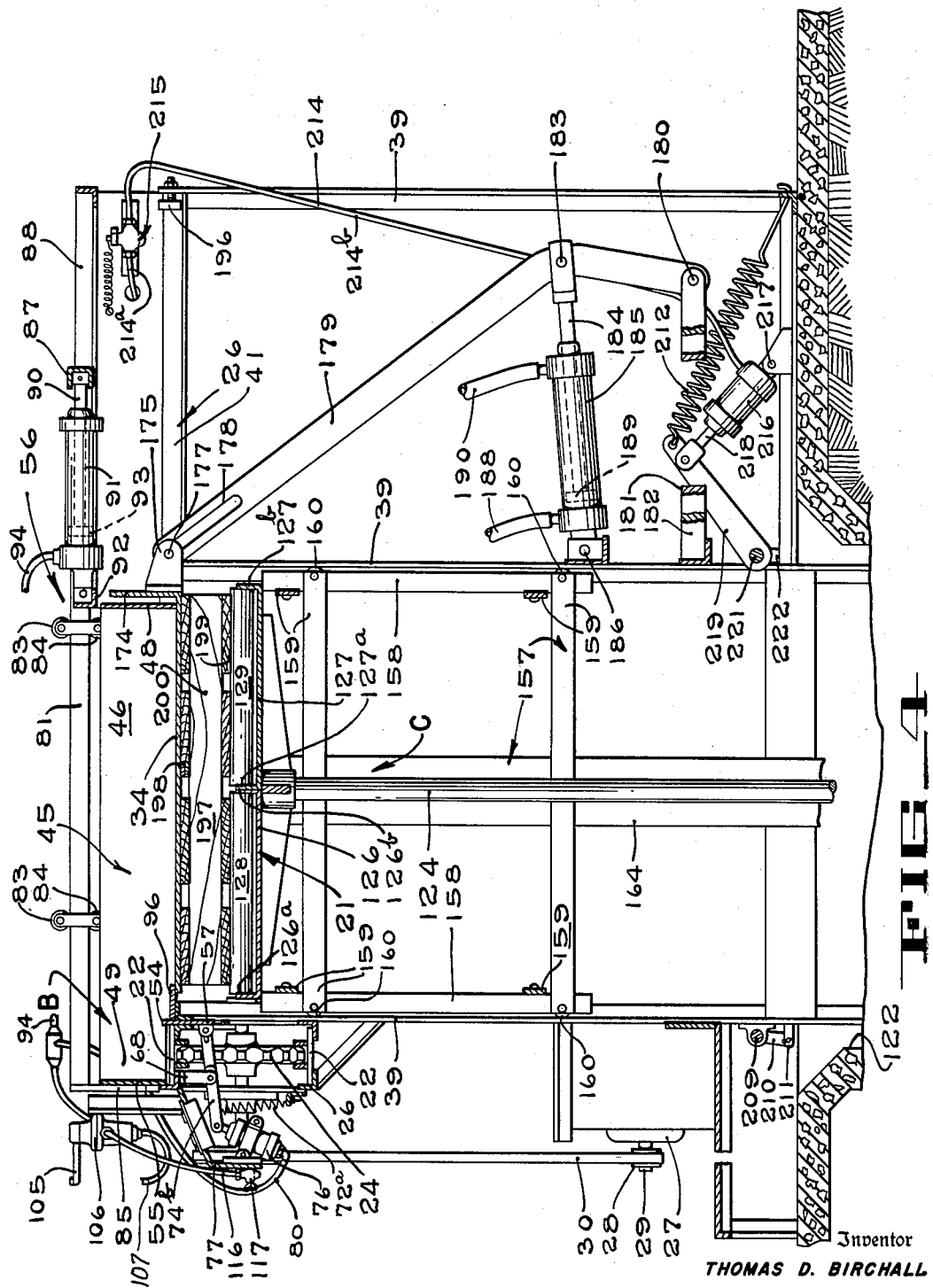

These and other objects of my invention will be apparent from the following description of the accompanying drawings which illustrate a preferred embodiment thereof and wherein:

Figure 1 is a perspective of a can stacking machine embodying my invention viewed from the feed end thereof, Figure 2 is a perspective of the same machine viewed from a diametrically opposite point to Figure 1, Figure 3 is a fragmentary plan view of the machine, Figures 4 and 5 are the upper and lower portions of a vertical longitudinal section through the machine taken along line 4—4 of Figure 3, Figure 6 is a vertical section through the machine similar to Figure 4 illustrating a different operational position thereof, Figure 7 is a fragmentary cross section through the machine taken along the line 7—7 of Figure 3 and viewed in the direction of the arrows associated with said line, Figures 8 and 9 are enlarged cross sectional detail views of the machine, illustrating the manner in which the can collector plate is mounted for sliding movement in the machine frame.

Figure 10A:
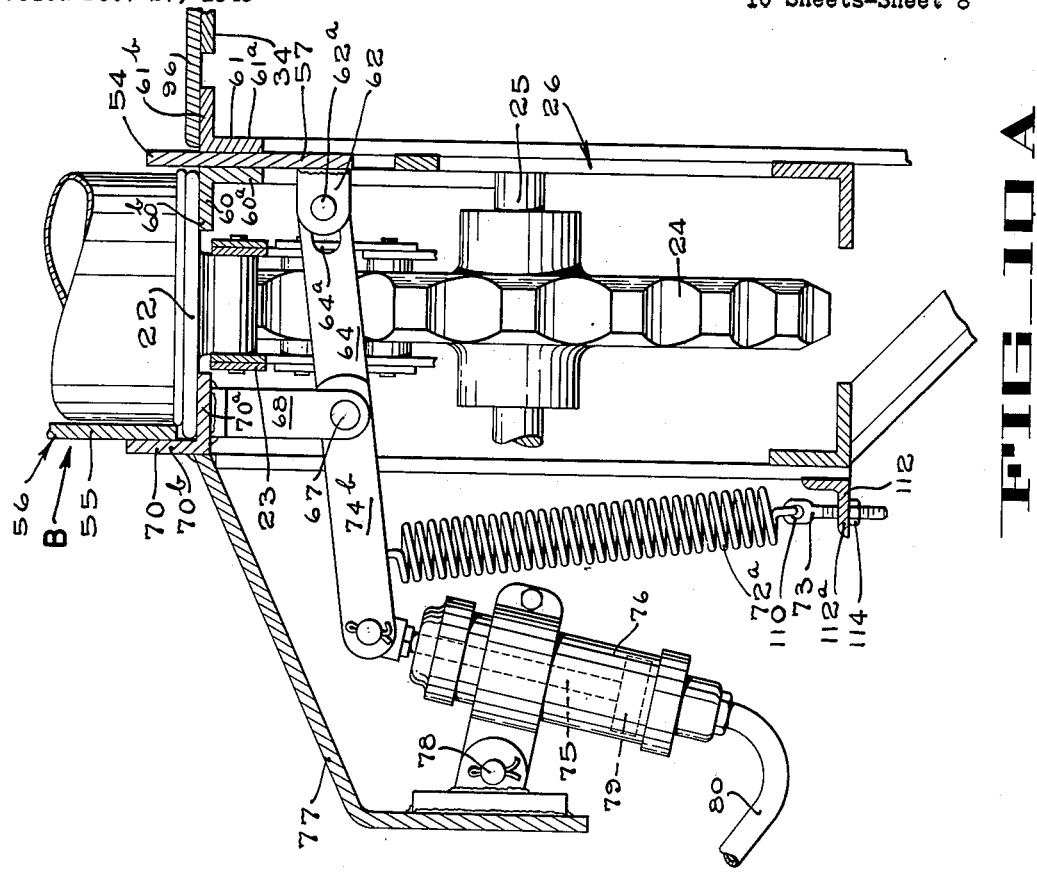
Figure 16:
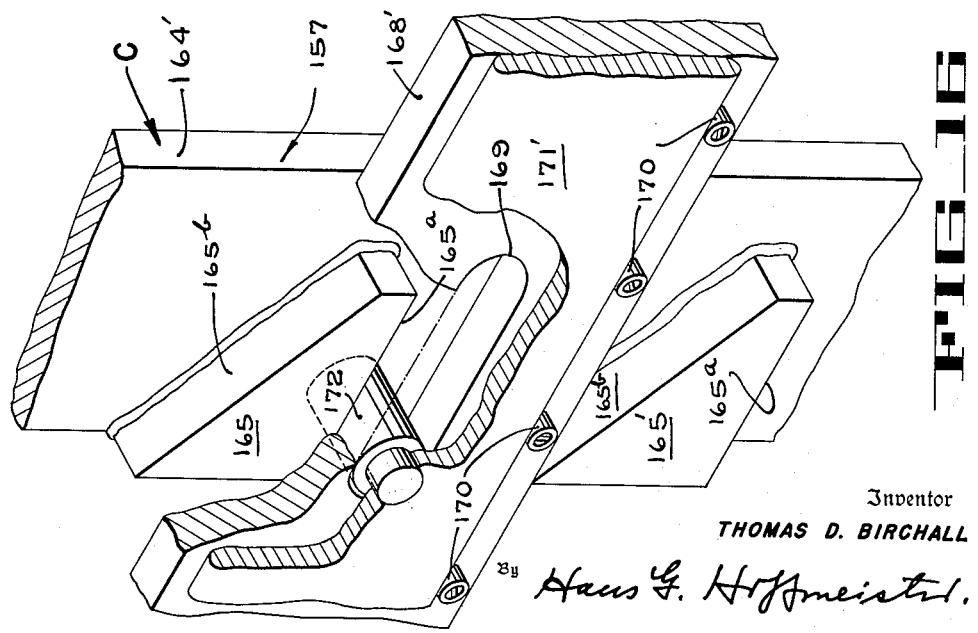

Figures 10a and 10b are vertical sections through the feed mechanism of the machine taken along line 10—10 of Figure 3 and illustrating two different operational positions thereof, Figure 11 is a fragmentary perspective of the same feed mechanism, in the same position as illustrated in Figure 10a, Figures 12 and 13 illustrate diagrammatically the hydraulic control system employed in the machine of the invention in different operational positions, Figure 14 is a fragmentary perspective of one of the operating levers provided to control said hydraulic system, Figure 15 is a fragmentary perspective of the mechanism which determines the position of the can-supporting table or platform during the operation of the machine, Figure 16 is an enlarged fragmentary detail view of part of the mechanism illustrated in Figure 15, Figures 17a, 17b, 17c and 17d illustrate diagrammatically four different operational positions of the valve mechanism employed in the machine of the invention to control the table positioning mechanism illustrated in Figures 15 and 16, and Figures 18, 19 and 20 illustrate diagrammatically three other different operational positions of the hydraulic elevator control valve shown in Figures 12 and 13.

Having first reference to Figures 1 and 3 a conveyor line A delivers a single file column of cylindrical food-containing cans 20 in upright position to the feed end of a can-tiering mechanism B. Said can-tiering mechanism in turn deposits completed can tiers successively upon the table or platform 21 of a hydraulic elevator C (Figures 4 and 6) from where a desired number of superposed tiers of cans may be shifted onto an adjoining roller conveyor line D for transportation to a place of storage.

The supply conveyor A is formed by an endless sequence of adjacently positioned slats 22 that are supported from an endless sprocket chain 23 (Figure 10a). Figures 1 and 3 illustrate the end of said conveyor line A adjacent to the tiering mechanism B where the sprocket chain 23 is trained around a sprocket 24 (Figures 4, 6 and 10a and b) that is mounted upon a drive shaft 25 which is suitably journaled in the machine frame 26. A motor 27 appropriately supported from the machine frame 26 below said sprocket 25 is arranged to operate the conveyor line in counterclockwise direction, as viewed in Figure 1, and for this purpose a small pulley 28 keyed upon the drive shaft 29 of said motor is operatively connected by a belt 30 with a wheel 31 that is firmly mounted upon the aforementioned shaft 25.

Adjacent to and slightly below the level of the upper run of the conveyor line A the tiering mechanism B possesses a horizontal collector plate 34 that is supported from the machine frame 26 for movement within a horizontal plane perpendicularly away from and back to said conveyor line. For this purpose the side edges of said collector plate 34 are bent upwards and outwards to form two outwardly directed lips 35 and 36, respectively, as shown in Figures 7, 8 and 9. Pivoted to the outer vertical and lower horizontal surfaces of each of said lips are a number of rollers 37 and 38 that turn about horizontal and vertical axes, respectively (Figures 8 and 9). Supported from uprights 39 of the machine frame 26 in a position adjacent and parallel to the lips 35 and 36 are two angle irons 41 and 42, respectively. The rollers 37 run upon the horizontal flanges 41a and 42a of said angle irons while the rollers 38 bear against the vertical flanges 41b and 42b thereof. Thus, the collector plate 34 is supported for smooth horizontal movement away from and back to the upper run of the conveyor line A.

Held slightly above the collector plate 34 is a stationary frame 45 of rectangular shape that is adapted to accommodate a predetermined number of parallel can rows. Said frame comprises two parallel side plates 46 and 47 that are rigidly supported from the machine frame 26 (Figures 3 and 7) and the rear wall of said frame is formed by a transverse bar 48 which is also rigidly supported from the machine frame. At its front the frame structure 45 is open, as shown in Figure 3, with the left one 46 of the above mentioned side walls extended over the upper run of the conveyor A to form a positive stop 49 for the cans riding thereon. The corresponding end of the right one 47 of said side walls is flared outwardly, as shown at 50, and terminates at a point adjacent to said conveyor line A so as to form a guide which leads into the interior of the space defined by the three-sided frame 45.

The conveyor line A is flanked by a pair of side walls 51 and 52 which form a corridor 53 above its upper run that guides the cans, riding on said conveyor, from a preceding can processing station such as a sterilizer or cooler (not shown) in a single file column to the open front end of the frame 45. Said side walls terminate in alignment with said outwardly flared lip 50, as shown in Figures 1 and 3; thereafter the advancing can column is guided between a guide rim 54 which flanks the upper conveyor run at its right side, as viewed in Figures 3 and 10a, and the front surface of a pusher head 55 which has the form of a vertically positioned plate that flanks the left side of the conveyor at a level slightly above its upper run and forms part of a can injector mechanism 56. Having reference to Figures 10a, 10b and 11 the guide rim 54 is formed by the upper edge of a vertically positioned rectangular plate 57 which extends transversely to and intermediately of the side walls 46 and 47 of the frame 45 (Figure 3) and is arranged to slide within a slot formed between the vertical flanges 60a and 61a of a pair of transversely disposed angle irons 60 and 61, respectively. Said angle irons are suitably supported from the machine frame, with the horizontal flange 60b of the angle iron 60 preferably arranged to form a support for the inner edge of the upper conveyor run. Attached to the plate 57 below flange 60a are two outwardly directed ears 62 and 63 provided with laterally projecting studs 62a and 63a, respectively, that engage slots 64a and 65a arranged in the ends of a pair of levers 64 and 65. Said levers are firmly mounted upon a transverse shaft 67 rotatably supported by short arms 68 and 69 that depend from the horizontal flange 70a of another transverse angle iron 70. Said angle iron 70 is also mounted in the machine frame and the upper surface of its horizontal flange 70a may be arranged to support the outer edge of the conveyor A, as shown, while its vertical flange 70b may form a stop for the previously mentioned pusher head 55 of the can injector mechanism 56 determining the extreme rearward position thereof. Springs 72a and 72b tensioned between the free ends of the levers 64 and 65 and suitable eyeletted screw members 73 that are anchored in the machine frame urge said levers in counterclockwise direction, as viewed in Figures 10a, 10b and 11 and in this manner maintain the guide plate 57 in an elevated position in which its upper rim 54 projects above the horizontal flanges 60b and 61b of the angle irons 60 and 61 into the space between the upper conveyor run and the collector plate 34, as shown in Figure 10a. Firmly mounted upon the transverse shaft 67 at a point intermediately of the levers 64 and 65 is a pair of parallel arms 74a and 74b which pivotally support the end of a piston rod 75 projecting from a pneumatic cylinder 76. Said cylinder in turn is pivotally supported from the control panel 77 of the machine, as shown at 78 in Figures 10a and 10b. Compressed air may be delivered into the pneumatic cylinder 76 below its piston 79 through a flexible conduit 80 to cause said piston 79 to rise and impart clockwise motion to the transverse shaft 67 which lowers the guide plate 57 against the urgency of springs 72a and 72b and thus retracts the guide rim 54 to or below the level of the horizontal angle iron flanges 60b and 61b, as shown in Figure 10b.

To operate the pusher head 55 of the can injector mechanism 56 a pair of drawbars 81 and 82 are mounted above the side plates 46 and 47, respectively, of frame 45 for sliding movement between pairs of vertically spaced rollers 83 and 84 that may suitably be supported from said side plates, as can be seen from Figures 1 and 2. The front ends of these drawbars are formed into inwardly directed diagonally descending hooks 85 and 86 which engage behind and are suitably secured to the pusher head 55, as best shown in Figure 1. The rear ends of the drawbars 81 and 82 are rigidly connected by a transverse channel bar 87 the oposite ends of which may be arranged to slide on tracks formed by a pair of horizontally positioned parallel angle irons 88 and 89, respectively, that are suitably supported from the machine frame (Figures 2, 3 and 6). The channel bar 87 is connected to the end of a piston rod 90 which projects in rearward direction from a horizontally positioned pneumatic cylinder 91. The base of said cylinder is secured to a transverse bar 92 that is rigidly supported from the machine frame 26 above the previously described rear wall 48 of the frame 45 and which may be provided with suitable recesses 92a and 92b that are slidably engaged by the drawbars 81 and 82, as shown in Figure 1. Compressed air may be delivered into the cylinder 91 behind its piston 93 through a flexible conduit 94 connected to the cylinder base, so as to project the piston rod further from cylinder 91 and move the transverse channel iron 87 with the drawbars 81 and 82 in rearward direction. Thus, whenever air is delivered into the cylinder 91, the drawbars 81 and 82 pull the pusher head 55 across the upper run of conveyor A (Figure 10b) so that cans situated upon said conveyor before the open side of the frame 45 are pushed onto the collector plate 34 into the interior of said frame. To prevent the cans from stumbling over the front edge of the collector plate a stationary bridge plate 96 may be mounted upon the horizontal flange 61b of the aforementioned transverse angle iron 61 and may be arranged to somewhat overlap the collector plate 34, as shown in Figures 10a and 10b. A pair of restore springs 97a and 97b are tensioned between the sliding channel iron 87 and eyeletted adjustment members 99 that are anchored in the stationary bar 92. Said springs urge the described pusher-head actuating-mechanism into a forward position determined by a pair of stationary buffers 100a and 100b which are rigidly supported from the machine frame and may be engaged by a pair of ears 101a and 101b, respectively, that project laterally from the drawbars 81 and 82 (Figure 3). In said position the pusher head 55 is held against the aforementioned vertical flange 70b of the transverse angle iron 70 and is thus properly positioned along the outer edge of the upper conveyor run (Figure 10a).

To activate the can injector mechanism the operator manipulates the control handle 105 of a pressure regulating valve 106 located above the control panel 77 at the left side of the machine (Figure 1) which valve controls the flow of compressed air from a suitable source represented by a conduit 107 to the aforementioned flexible conduits 80 and 94 that lead to the cylinders 76 and 91, respectively. Said valve 106 is ordinarily in closed position, but as soon as the proper number of cans has assembled before the open entrance of the frame 45, the operator opens said valve so that compressed air is forced into the pneumatic cylinders 76 and 91. As a result thereof the piston rods 75 and 90 are projected further out of their respective cylinders and effect lowering of the guide rim 54 and advance of the pusher head 55 across the upper conveyor run, respectively (Figure 10b).

For proper operation of the described mechanism it is evidently essential that the guide rim 54 be fully withdrawn below the level of the upper conveyor run and the bridge plate 96, respectively, before the pusher head 55 commences to shift the cans toward the collector plate, as otherwise the cans might be crushed between the guide rim and the advancing pusher head. For this purpose the strength of the springs 72a, 72b and 97a, 97b must be carefully adjusted relative to one another to enable the piston 79 within cylinder 76 to yield to the force of the compressed air slightly ahead of the piston 93 within the cylinder 91. Having reference to Figures 10a and 10b, the stems 110 of the eyeletted members 73 to which the ends of the restore springs 72a, 72b of the guide-rim control mechanism are secured, are threaded and extend through suitable openings in the horizontal flange 112a of yet another transverse angle iron 112 that is suitably supported from the machine frame 26. The downwardly protruding ends of said members 73 are engaged by adjustment nuts 114 and by turning said nuts the vertical position of the members 73 may be raised or lowered to decrease or increase the tension of the springs 72a and 72b as may be required. The eyeletted members 99 which hold the restore springs 97a and 97b of the pusher-head actuating mechanism may be anchored within the stationary bar 92 in a similar fashion, as shown in Figure 3. By adjusting said members 73 and 99 in such a manner that the springs 72a and 72b are appropriately weakened as compared with the springs 97a and 97b the piston 79 of cylinder 76 may be made to yield more readily to the force of the compressed air than the piston 93 of the cylinder 91. Hence, upon opening of the pressure regulating valve 106 the guide rim 54 will be lowered slightly before the pusher head 55 is advanced so that said pusher head may shift the cans onto the collector plate 34 without meeting any obstruction.

To prevent the conveyor from delivering newly arriving cans into the space behind the pusher head 55 when the latter is in the advanced position illustrated in Figure 1 said pusher head is provided with a rearwardly directed lateral lip 55a which slides in front of and closes the supply corridor 53 formed by the side walls 51, 52 whenever the pusher head 55 advances from its rearmost position.

After a row of cans has been transferred from the conveyor A onto the collector plate 34 in the described manner, the operator returns the handle 105 of the pressure regulating valve 106 to its initial position wherein it blocks the air supply conduit 107. In this position the valve 106 connects the branch conduits 80 and 94 to a flexible tube 116 which discharges into the outside. Thus, the compressed air previously forced into the cylinders 76 and 91 may now escape into the outside atmosphere which enables the springs 72a, 72b and 97a, 97b to restore the pistons 79 and 93 of said cylinders to their original positions. As a result thereof the pusher head 55 is retracted to its initial position to the left of the conveyor A, as viewed in Figure 10a, and the rim 54 is raised to a level where it may again act as a guide for the new supply of cans arriving on conveyor A; and owing to the aforementioned adjustment in the relative strength of the restore springs 72a, 72b and 97a, 97b the described restore operations will occur in the order named because the greater strength of the springs 97a, 97b will retract the pusher head 55 before the weaker springs 72a, 72b are capable of lifting the guide rail 54. To control the speed with which the described restore operations may proceed, a manually settable control valve 117 may be provided at the discharge end of the relief tube 116.

By properly adjusting said valve 117, the restore operations may be made to occur at a sufficiently slow rate to diminish noise and protect the machine from excessive wear.

After the pusher head 55 has returned to its initial position with its lip 55a withdrawn from the supply corridor 53, another set of cans may assemble before the open end of the frame 45; and as soon as the proper number of cans is again aligned before said frame, the operator manipulates the pressure regulating valve 106 again to cause another set of cans to be pushed onto the collector plate 34, which new set of cans comes against and slides the previously deposited row of cans within the side walls 46 and 47 of the frame 45 further onto said plate. In this manner the total can-collecting space formed by the frame 45 above the plate 34 may be filled with cans by repeating the described operations until the first row of cans deposited onto said plate contacts the rear wall 48 of the frame 45.

Thereafter means are set into motion which withdraw the plate 34 rapidly from underneath the assembled tier of cans resting thereon so that said tier of cans may drop upon the table 21 of the hydraulic elevator C underneath.

Having reference to Figure 5, a hydraulic cylinder 120 is mounted in upright position upon a pedestal 121 located at the bottom of a concrete-walled pit 122. Slidably disposed within said cylinder is a piston 123 from which rises a vertical shaft 124 that carries on its upper end the table 21 (Fig. 4). To facilitate the removal of heavy loads from said table the same may be formed by a pair of channels 126 and 127 each having two upwardly directed side flanges 126a, 126b and 127a, 127b, respectively, which pivotally support a plurality of adjacently positioned transverse rollers 128 and 129.

To raise the table 21 to the elevated position illustrated in Figure 4, a suitable liquid, such as oil, is forced into the interior of the cylinder 120 (Fig. 5) below the plunger 123. Having reference to Figures 1 and 2, the drive shaft 130 of a continuously operating motor 131 suitably mounted upon the machine frame is operatively connected to the crank wheel 132 of a pump 133 by means of a belt 134. Said pump draws liquid from a reservoir 135 through a pipe 136 and delivers said liquid through another pipe 137 that divides into two branches 137a and 137b at its end, to a twin valve structure 138 as shown in Figure 12. As diagrammatically indicated in said Figure 12, said twin valve structure comprises two separate and independently adjustable valves 139 and 140, respectively, the former being arranged to control the position of the hydraulic elevator table 21 while the latter is arranged to control the position of the collector plate 34, as will presently appear.

The operator of the machine may set the valve 139 to its various positions of adjustment by means of an operating lever 143 located at the right side of the aforementioned control panel 77 (Figure 1) and connected to the control member 139a of said valve 139 through a train of links and levers collectively identified by the reference numeral 145 (Figures 1 and 2). By appropriate manipulation of said operating lever 143 the control member 139a of the valve 139 may be set into the position illustrated in Figure 12 in which it conducts the liquid received from the pump 133 through a pipe 146 into the interior of the cylinder 120 below the piston 123, and at the same time connects a pipe 147 leading from the upper end of the cylinder with a pipe 148 that discharges into the reservoir 135. Thus, as liquid is pumped into the interior of the cylinder 120 below the piston 123 to raise the table 21, liquid contained in the interior of the cylinder above the piston 123 is permitted to escape through the conduits 147 and 148 into the reservoir 135. On the other hand, when the table 21 is to be lowered, the operator manipulates the lever 143 to set the control member 139a of the valve 139 to the position illustrated in Figure 13, wherein the output of the pump 133 is directed through the pipe 147 into the interior of the cylinder 120 above the plunger 123 to force the piston down, while the pipe 146 is connected to the aforementioned pipe 148, so that the liquid below plunger 123 may escape from the cylinder 120 and return to the reservoir 135. Valves of the type described are well known in the art and readily available on the market for which reason it is unnecessary to describe their internal construction in greater detail. Suffice it to say, that aside from the above described extreme positions of adjustment in which they positively raise or lower the table 21, they have also a neutral position of adjustment (Figure 19) wherein liquid is neither delivered into, nor allowed to escape from, the interior of the cylinder 120 and the output of pump 133 is returned directly to the reservoir 135 through a suitable bypass 300 having a pressure relief valve 301 interposed therein. Furthermore, such valves provide intermediate settings (Figs. 18 and 20) half way between said neutral position and either of their extreme positions in which the liquid below the piston 123 is permitted to escape under the weight of the table 21 and whatever load may be placed thereon, so that the table will gradually sink to lower levels. In Fig. 18 the pipe 146, which drains fluid from below the piston 123, is connected through an opening 139b to the line 148 that leads to the reservoir 135. Since the supply line 137a is shut off, the piston 123 will descend at a rate dictated by the size of the opening 139b in the valve sleeve. In Fig. 20 a similar setting is illustrated wherein the pipe 146, which is connected to the lower side of the piston, directs fluid to the reservoir 135 through an opening 139c in the valve sleeve which is similar to the opening 139b used in the setting of Fig. 18. However, these two openings 139b and 139c may be of different sizes so that the table will descend faster when one opening is used than when the other is used. In Fig. 19, a setting of the valve is illustrated wherein both the supply line 137a and the drain lines 147 and 146 are locked. With this setting, the table is held in a fixed position. Accordingly the operating lever 143 for the valve 139 has five different positions of adjustment and means are provided in accordance with my invention to hold said lever yieldably within any one of said five positions. Having reference to Figure 14, an angle bar 150 is suitably secured with its horizontal flange 150a to the aforementioned control panel 77 and a bar 151 having five angularly diverging grooves 152a, 152b, 152c, 152d and 152e, corresponding to the five different settings of lever 143 is slidably supported from the vertical flange 150b of said angle bar. Springs 153 and 154 interposed between the bar 151 and the vertical flange 150b of angle bar 150 urge said bar 151 laterally against the lever 143 and in this manner retain said lever yieldably in whatever groove 152 it may engage at the moment. Whenever the lever 143 is shifted to the extreme forward groove 152e, the valve 139 is set to raise the table 21, and whenever the lever is shifted to the extreme rearward groove 152a the valve 139 is set to lower the table 21. The center groove 152c corresponds to the neutral position of the valve 139, while both the grooves 152b and 152d mark intermediate positions at which the table 21 is free to sink to lower levels under its own weight.

For smooth operation the table 21 is mounted upon a cage 157 composed of four vertical angle irons 158 the diverging sides of which are outwardly directed and which are rigidly interconnected by a plurality of horizontally positioned braces 159. Pivoted to the outer diverging surfaces of each of said angle irons 158 for rotation about horizontal axes are several pairs of rollers 160 that bear against and run along the inner diverging surfaces of four vertically positioned angle bars which rise from the bottom of pit 122 at the four corners thereof, as shown in Figures 1, 2, 4 and 5, and constitute the previously mentioned uprights 39 of the machine frame.

To positively hold the table 21 at predetermined levels whenever the control lever 143 is set to the previously described intermediate positions of adjustment 152b or 152d, two vertical bars 164 and 164' are attached to the braces 159 of cage 157 at the flanks thereof, as best shown in Figures 1 and 2. Attached to each of said bars 164, 164' in vertically superposed relation is a plurality of blocks 165, 165' of substantially triangular shape which have horizontal bottom edges 165a. Secured to the transverse flanges of the corner posts 39 at about ground level are two elongated rectangular plates 168 and 168' each containing a horizontal guide slot 169 (Figures 15 and 16). Supported upon a plurality of rollers 170 pivoted to the outer faces of the plates 168, 168' for horizontal movement along said plates are slides 171 and 171', respectively, and pivoted to the inner face of each of said slides is a rolling pin 172 that protrudes inwardly through the guide slot 169 of plate 168 or 168' and rolls upon the bottom edge of said slot, as best shown in Figure 16. When the hydraulic elevator table 21 is free to descend under its own weight, blocks 165, 165' at each side of cage 157 engage the pins 172 with their horizontal bottom edges 165a and as a result thereof further descent of the table 21 is positively arrested. As will be presently explained, means are provided in accordance with the invention that are automatically effective to withdraw the rolling pins 172 from underneath the blocks 165, 165' each time the collector plate 34 has been withdrawn from underneath the frame 45, so that the table 21 may sink to an appropriately lower level whenever a layer of cans has been deposited thereon.

To operate the collector plate 34 its rear end portion is turned upwardly to form a lip 174 to which is secured a lug 175, as shown in Figures 4 and 6; said lug is provided with a laterally directed stud 177 which engages an elongated slot 178 provided in the upper end of a one-armed lever 179. The lower end of said lever is pivotally supported at 180 by a pair of arms 181 and 182 that are secured to the machine frame. Pivotally connected to an intermediate point 183 of said lever 179 is the rearwardly projecting piston rod 184 of a hydraulic cylinder 185 the base of which is pivotally supported from the machine frame at a point 186 forwardly of the lever 179. The hydraulic cylinder 185 is operated by the same pump 133 which operates the cylinder 120 that controls the position of the table 21. Referring to Figure 12 the right branch 137b of the bifurcated discharge conduit 137 leads into the valve 140 of the twin valve structure 138. Said valve may be of the same construction as the previously described valve 139 and its control member 140a may be set to a position wherein the liquid received from the pump 133 through the conduit 137 is delivered through a conduit 188 into the interior of the cylinder 185 below its piston 189, while a conduit 190 leading from the upper end of said cylinder 185 is connected to a conduit 191 that returns the liquid, forced from cylinder 185 by the rise of the piston 189, into the reservoir 135; and vice versa the control member 140a may be set to a position wherein it directs the output of the pump 133 through the conduit 190 into the cylinder space above the piston 189, as shown in Figure 13, and at the same time connects the conduit 188 to the aforementioned conduit 191 so that the liquid forced out of the cylinder 185 by the descending piston 189 may again return to the reservoir 135. The operator may set the valve 140 to either of the two above described positions by appropriate manipulation of a control lever 193 that projects from a slot 194 in the control panel 77 of the machine at a point adjacent to the previously described table-control lever 143 (Figure 1) and which is operatively connected to the control member 140a of the valve 140 by a suitable train of links and levers collectively identified by the reference numeral 195 in Figure 2.

Whenever the valve 140 is set to the position illustrated in Figure 12 the piston 189 is forced to rise and projects its piston rod 184 further out of the cylinder 185 which forces the lever 179 to swing backwards and pull the collector plate 34 rearwardly away from underneath the collector frame 45 until the lip 174 of said plate comes against a pair of stop members 196 and 197 provided at the rear end of the previously described angle irons 41 and 42 that form tracks for the rollers 37, 38 of the collector plate 34.

When using the machine of the invention a pallet 197 is placed upon the hydraulic elevator table 21. Such pallets comprise usually a pair of vertically spaced horizontal plates 198 and 199 which may be composed of a plurality of parallel boards and which are connected with one another by several parallel fillets 200, the arrangement being such that the space between the horizontal plates 198 and 199 is divided into at least two parallel slots 201 and 202 (Figure 7) that may be conveniently engaged by the fork of a lifted truck (not shown) such as is usually employed to transport loaded pallets to and from their places of storage. With a pallet 197 placed upon the hydraulic elevator table 21 the operator sets the control lever 143 to the position 152e to raise the table until the empty pallet is situated directly underneath the collector plate 34, as shown in Figure 4. Whenever the table 21 is to be raised, it is of course necessary that the previously described supporting pins 172 are held out of the path of the blocks 165, 165' that are secured to and move with the cage structure 157. For this purpose the operator steps on a pedal 203 formed at the free end of a one-armed lever 204 which is pivotally secured to the machine frame below the control panel 77, as shown at 205 in Figures 1 and 15. Pivotally secured to the lever 204 at an intermediate point 206 thereof is the upper end of a vertical link 207. The lower end of said link is pivotally connected to an arm 208 that is firmly mounted upon a transverse horizontal shaft 209 which is rotatably supported from the machine frame, as shown in Figures 1 and 2. Firmly secured to the opposite ends of said shaft 209 are two downwardly directed arms 210 and 210'. Horizontally disposed interponents 211 and 211' connect the free ends of said arms pivotally to the forward ends of the previously described slide bars 171 and 171', respectively, which carry the rolling pins 172. Whenever the operator steps on the pedal 203, the shaft 209 is turned in counterclockwise direction, as viewed in Figure 15, which causes the arms 210 and 210' to push the slides 171 and 171' in rearward direction against the force of a restore spring 212, to be presently described, until both the pins 172 stand clear of the vertical path of movement of the stop blocks 165 and 165'.

When the table 21 has been raised to a position wherein the pallet 197 is located directly below the collector plate 34, as shown in Figure 4, the operator sets the table control lever 143 to one of the intermediate positions 152b or 152d and releases the pedal 203. As a result thereof the table 21 begins to sink, while the restore spring 212 returns the pins 172 to their original positions in vertical alignment with the stop blocks 165 and 165'. Thus, the descent of the hydraulic elevator table 21 is soon arrested by engagement of the pins 172 with the first pair of the stop blocks 165, 165' that the pins encounter.

With the table 21 positively supported in the described manner and a complete layer of cans assembled upon the collector plate 34 within the frame 45, the operator sets the collector plate control lever 193 to a position in which the valve 140 delivers the output of pump 133 into cylinder 185 through pipe 188, as illustrated in Figure 12. This causes the collector plate 34 to be fully withdrawn in rearward direction from underneath the layer of cans contained within frame 45, so that the cans drop on the pallet 197 underneath. In accordance with my invention this rearward movement of plate 34 is arranged to actuate the pins 172 in such a manner that table 21 drops to and is held at a new level which is lower by a distance equal to the height of the handled cans. Having reference to Figures 2, 3 and 4 a flexible conduit 214 controlled by a valve 215 is arranged to deliver compressed air from the previously mentioned source into a pneumatic cylinder 216 that is pivotally supported from the floor of the machine frame, as shown at 217. Pivoted to the forwardly projecting end of the piston rod 218 of said cylinder 216 is a lever 219 the lower end of which is firmly mounted upon a transverse horizontal shaft 221. Said shaft 221 is suitably journaled in the machine frame rearwardly of the hydraulic elevator C and forms a twin to the previously described horizontal shaft 209 that extends across the front end of said elevator, as shown in Figure 15. Firmly secured to the opposite ends of said shaft 221 are two downwardly extending arms 222 and 222', respectively, the ends of which are pivotally linked to the previously described slides 171 and 171' by means of interponents 223 and 223', respectively. The aforementioned restore spring 212 is tensioned between the upper end of lever 219 and a suitable point of the machine frame rearwardly of cylinder 216 and holds the shaft 221 yieldably in a clockwise position, as viewed in Figures 2 and 15, in which the piston rod 218 is fully inserted into the cylinder 216, and the control pins 172 carried by the slides 171 and 171' are vertically aligned with the blocks 165, 165' of the elevator cage 157 and thus engage a pair of said blocks.

Ordinarily the aforementioned valve 215 is in a position wherein it blocks the flow of compressed air from its source to the pneumatic cylinder 216. It has an operating arm, however, that extends into the path of the collector plate 34 as it is withdrawn from underneath the frame 45, and which may be actuated by said collector plate as it travels in rearward direction, to open the valve 215 and deliver compressed air into the cylinder 216. Figures 17a to 17d illustrate diagrammatically a valve that is adapted to operate in the manner required by the invention. Interposed between the portions 214a and 214b of the conduit 214 is a cylindrical valve housing 227 within which is rotatably arranged a control member 228 provided with an actuating arm 229. Said control member is perforated by a diametrical bore 230 and has a peripheral groove 231 of limited angular width. A coil spring 232 tensioned between the end of said actuating arm 229 and a suitable point 233 of the machine frame holds the control member 228 yieldably in a clockwise position, determined by a stop lug 234, wherein the bore 230 is out of alignment with the inlet and outlet ports of the tube sections 214a and 214b while the groove 231 connects the tube section 214b to a port 235 that leads to the outside. Thus, the supply of compressed air from its source to the cylinder 216 is blocked and any compressed air previously supplied into said cylinder may escape through tube section 214b, groove 231 and valve port 235. Pivoted to the end of the actuating arm 229 is a live point 236. Said live point is resiliently held in linear alignment with said actuating arm by a coil spring 237 that is tensioned between a projection 238 of said live point and an eye 239 provided in the actuating arm 229 and which urges a stop lug 240 of said live point 236 against the counterclockwise edge of the actuating arm, as shown in Figure 17a. The live point 236 is arranged to extend into the path of an actuating ear 241 secured to the rear of the collector plate 34. Thus, when the collector plate 34 is withdrawn from underneath the collector frame 45, the ear 241 strikes against the live point 236 and pushes it out of its way; and since said live point forms a rigid extension of the actuating arm 229 when struck in rearward direction, due to the presence of the stop lug 240, the actuating arm 229 is pushed in counterclockwise direction and swings the rotary valve member 228 into the position illustrated in Figure 17b wherein the bore 230 is aligned with, and connects the tube sections 214a and 214b so that compressed air is delivered into the pneumatic cylinder 216. As a result thereof the piston rod 218 is projected further out of said cylinder and turns the horizontal shaft 221 in counterclockwise direction, as viewed in Figure 15, so that the stop pins 172 are withdrawn from underneath whatever pair of blocks 165 and 165' they may engage at the moment. Thus, whenever a layer of cans has been deposited upon the hydraulic elevator table 21 by the withdrawal of the collector plate 34, said table is automatically released to sink to a lower level, but as soon as the ear 241 has passed the live point 236, the spring 232 returns the actuating arm 229 and the valve member 228 to their initial positions (Figure 17c) which does not only block further supply of compressed air to the cylinder 216 but allows the compressed air previously forced into said cylinder to escape through the outlet port 235. As a result thereof the restore spring 212 is free to force the piston rod 218 back into the cylinder 216 and thus returns the pins 172 to their initial positions in vertical alignment with the blocks 165 and 165'. Hence, the blocks directly above those that previously engaged the pins 172 come to rest upon said pins, and since the base edges 165a of the superposed blocks 165, 165' are vertically spaced from one another by a distance substantially equal to the height of a can, the table 21 is positively supported at a new level at which the top surface of the can layer deposited upon the pallet 197 is located directly below the level of the collector plate 34. To facilitate re-entry of the roller pins 172 into the spaces between the superposed stop blocks 165, 165' as they return to their initial positions under the force of the restore spring 212, the upper edges 165b (Figure 16) of said blocks are arranged to slant upwardly in the direction in which the pins 172 approach, as shown in Figures 1, 2 and 16. Hence, the pins are not likely to be forced against a vertical edge which might interfere with the proper descent of the hydraulic elevator table 21 and retard the operation of the machine.

After the hydraulic elevator table 21 has come to rest with the upper surface of the layer of cans deposited upon the pallet 197 located slightly below the level of the collector plate 34, the operator manipulates the collector plate control lever 193 to set the valve 140 to the position illustrated in Figure 13 wherein the output of pump 133 is conducted through conduit 190 into the upper end of the cylinder 185 and forces the piston 189 toward the cylinder bottom. As a result thereof the lever 179 is pulled forwardly and pushes the collector plate 34 past the control valve 215 back to its initial position above the table 21 and the layer of cans just deposited thereon. As the actuating ear 241 moves past the valve 215, it strikes against the live point 236 in forward direction and causes it to yield in clockwise direction against the urgency of its restore spring 237, as shown in Figure 17d. Thus, the actuating ear 241 may pass the valve 215 unhindered and without affecting the position of the valve arm 229.

With the collector plate 34 returned to its initial position and the conveyor line A in continuous movement, the operator may again manipulate the pressure regulating valve 106 in the proper intervals to deliver row after row of cans onto the collector plate 34 until another complete tier of cans has been assembled within the frame 45. Thereupon he manipulates the collector plate control lever 193 again to retract said plate from underneath the frame 45 and drop a second layer of cans on top of the layer previously deposited upon the pallet 197; and as soon as said second layer of cans has been dropped onto the first layer, the table 21 is again automatically lowered by a distance substantially equal to the height of a can layer so that the operator need only manipulate the lever 193 to return the collector plate 34 to its initial position. Thereupon, he may continue the described sequence of operations until as many tiers of cans are stacked upon the pallet 197 as find room in the space between the collector plate 34 and the table 21 in its lowermost position. In practice the operator will place a sheet of cardboard, strong paper, asbestos or like material upon each second or third layer of cans, as indicated at 245 in Figure 6, to contain each two or three layers of cans between two such sheets or a sheet and the pallet, respectively, and thus prevent tilting of the cans which may result in collapse of the can stack. When the hydraulic elevator table 21 has reached its lowermost position with the upper surface of its transverse rollers 128, 129 flush with the rollers 250 and 251 of the previously mentioned roller conveyor D at the left open flank of the elevator C (Figure 1), the pallet 197 with the stack of cans loaded thereon may simply be shifted from the rollers of the table 21 onto the rollers of conveyor D which may be arranged to deliver said loaded pallet to a place of storage or from which said loaded pallet may be lifted by the fork of a lifter truck (not shown).

While I have explained my invention with the aid of an exemplary embodiment thereof, it will be understood that I do not wish to be limited to the specific constructional details shown and described which may be departed from without departing from the scope and spirit of my invention.

I claim:

1. In a machine for stacking cans, an arrangement for supporting the growing stack of cans comprising a table mounted for movement in a vertical direction, means controlling the vertical position of said table including a setting permitting said table to sink from an elevated to a lower position, stop means for positively arresting the sinking movement of said table at predetermined intervals between its highest and lowest position, spring means urging said stop means into case-arresting position, a pivotally mounted power cylinder operatively connected to said stop means and arranged upon energization to move said stop means out of case-arresting position against the action of said spring, and a control linkage connected to said stop means and arranged when actuated to move said stop means out of case-arresting position, the pivotal mounting of said power cylinder being arranged to permit pivoting movement of said cylinder in a predetermined direction when said control linkage is actuated to move said stop means out of case-arresting position.

2. Arrangement for stacking tiers of cans above each other comprising a plate mounted for horizontal movement between a first and a second position, means operable to reciprocate said plate between said first and second positions, a vertically moveable table disposed below said plate in vertical alignment with its first position, means controlling the vertical position of said table comprising a setting permitting said table to sink from an elevated to a lower position, vertically superposed blocks supported in rigid connection with said table, an element moveable from a first position clear of said blocks into a second position in vertical alignment with said blocks and adapted in said last mentioned position to engage one of said blocks and positively arrest the sinking movement of said table, spring means urging said element into the second of its positions, a fluid actuated cylinder operatively connected to said element in a manner adapted upon activation to force said element into the first of its positions clear of said blocks, a normally closed fluid control valve arranged to control the supply of fluid to said cylinder and having an actuating arm extending into the path of movement of said plate in a manner adapted to open said valve when struck in the direction of movement of said plate from its first to its second position.

3. Arrangement according to claim 2 comprising spring means arranged to urge said valve actuating arm into valve-closing position, and wherein the end of said arm is formed by a live point arranged to form a rigid extension of said arm when struck in the direction of movement of said plate from its first to its second position and to yield resiliently when struck in the opposite direction.

4. Arrangement according to claim 2 wherein said fluid cylinder is a pneumatic cylinder provided with a vent adapted to connect the interior of said cylinder to the outside when said valve is in a closed position.

5. Arrangement for stacking tiers of cans above each other comprising a plate mounted for movement within a horizontal plane between a first and a second position, means operable to move said plate between said first and second positions, a vertically movable table disposed below said plate in vertical alignment with its first position, means controlling the vertical position of said table comprising a setting permitting said table to sink from an elevated to a lower position, stop means movable into an effective position wherein it positively arrests the sinking movement of said table, spring means urging said stop means into said effective position, a pneumatic cylinder operatively connected to said stop means in a manner adapted upon activation to move said stop means out of its effective position, a normally closed pneumatic valve arranged to control said cylinder and having an actuating arm extending into the path of movement of said plate in a manner adapted to open said valve temporarily when struck in the direction of movement of said plate from said first to said second position.

6. Arrangement for stacking tiers of cans above each other comprising a reciprocable plate mounted for movement within a horizontal plane between a loaded and an unloaded position, a vertically movable table disposed below said plate in vertical alignment therewith when said plate is in a loaded position, means for stripping a tier of cans from said plate, power means operable to move said plate between said loaded and unloaded positions to effect transfer by said stripping means of said tier of cans from said plate to said table, means controlling the vertical position of said table including a setting permitting said table to sink from an elevated to a lower position, stop means for positively arresting the sinking movement of said table at predetermined intervals between its highest and lowest position, means for maintaining said stop means in an effective table arresting position, power means operatively connected to said stop means in a manner adapted upon activation to move said stop means out of its effective position, and means arranged to control said power means and adapted to be actuated by said plate during reciprocative movements of same.

References Cited in the file of this patent

UNITED STATES PATENTS

| | | |
|---|---|---|
| 768,104 | Wieda | Aug. 23, 1904 |
| 1,208,802 | Lienau et al. | Dec. 19, 1916 |
| 1,208,803 | Lienau et al. | Dec. 19, 1916 |
| 1,545,225 | Zeh | July 7, 1925 |
| 1,801,696 | Semashko | Apr. 21, 1931 |
| 1,839,375 | Covey | Jan. 5, 1932 |
| 2,065,674 | Fay | Dec. 29, 1936 |
| 2,135,805 | Evans | Nov. 8, 1938 |
| 2,234,990 | Todhunter | Mar. 18, 1941 |
| 2,245,694 | Lindholm | June 17, 1941 |
| 2,318,567 | Duerig | May 4, 1943 |
| 2,396,090 | Curtis | Mar. 5, 1946 |
| 2,508,861 | Jessen | May 23, 1950 |
| 2,538,734 | Patterson | Jan. 6, 1951 |